United States Patent
Yang

(10) Patent No.: US 11,710,882 B2
(45) Date of Patent: Jul. 25, 2023

(54) BATTERY

(71) Applicant: Contemporary Amperex Technology Co., Limited, Ningde (CN)

(72) Inventor: Jianxiong Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 40 days.

(21) Appl. No.: 17/478,886

(22) Filed: Sep. 18, 2021

(65) Prior Publication Data
US 2022/0006163 A1    Jan. 6, 2022

Related U.S. Application Data

(63) Continuation of application No. PCT/CN2020/080437, filed on Mar. 20, 2020.

(30) Foreign Application Priority Data

Apr. 8, 2019    (CN) .......................... 201920461233.X

(51) Int. Cl.
*H01M 50/591*    (2021.01)
*H01M 50/143*    (2021.01)
(Continued)

(52) U.S. Cl.
CPC ....... *H01M 50/591* (2021.01); *H01M 50/143* (2021.01); *H01M 50/383* (2021.01);
(Continued)

(58) Field of Classification Search
CPC .. H01M 50/591; H01M 50/143; H01M 50/50; H01M 50/54; H01M 50/547; H01M 50/383; H01M 50/593
See application file for complete search history.

(56) References Cited

U.S. PATENT DOCUMENTS

2021/0066700 A1 *  3/2021  Wang .................... H01M 10/38

FOREIGN PATENT DOCUMENTS

| CN | 103606637 A | 2/2014 |
|---|---|---|
| CN | 105591062 A | 5/2016 |

(Continued)

OTHER PUBLICATIONS

The International search report for PCT Application No. PCT/CN2020/080437, dated Jun. 28, 2020, 15 pages.
(Continued)

*Primary Examiner* — Jane J Rhee
(74) *Attorney, Agent, or Firm* — East IP P.C.

(57) ABSTRACT

The present disclosure relates a battery, including an electrode assembly, a first tab, a second tab, a cap plate assembly, a first electrode terminal, a second electrode terminal and a shaping plate. The electrode assembly includes a first electrode plate, a second electrode plate and a separator arranged between the first electrode plate and the second electrode plate; each of the first electrode terminal and the second electrode terminal is arranged on the cap plate assembly; the first electrode terminal is connected to the first electrode plate through the first tab; the second electrode terminal is connected to the second electrode plate through the second tab; the shaping plate is arranged between the cap plate assembly and the electrode assembly, and each of the first tab and the second tab is bent around the shaping plate; the shaping plate is fixed and thermally fused to the cap plate assembly.

10 Claims, 8 Drawing Sheets

(51) Int. Cl.
*H01M 50/54* (2021.01)
*H01M 50/547* (2021.01)
*H01M 50/383* (2021.01)
*H01M 50/593* (2021.01)
*H01M 50/50* (2021.01)

(52) U.S. Cl.
CPC ........... *H01M 50/50* (2021.01); *H01M 50/54* (2021.01); *H01M 50/547* (2021.01); *H01M 50/593* (2021.01)

(56) References Cited

FOREIGN PATENT DOCUMENTS

| | | |
|---|---|---|
| CN | 105655536 A | 6/2016 |
| CN | 205543009 U | 8/2016 |
| CN | 205609629 U | 9/2016 |
| CN | 107968182 A | 4/2018 |
| CN | 208189697 U | 12/2018 |
| CN | 209344216 U | 9/2019 |
| WO | 2018021698 A1 | 2/2018 |

OTHER PUBLICATIONS

The extended European search report for EP Application No. 20787918.0, dated Mar. 18, 2022, 9 pages.

* cited by examiner

BATTERY

CROSS REFERENCE TO RELATED APPLICATION

The present application is a continuation of International Application No. PCT/CN2020/080437, filed on Mar. 20, 2020, which claims priority to Chinese Patent Application No. 201920461233.X, filed on Apr. 8, 2019, titled "BATTERY", both of which are hereby incorporated by reference in their entireties.

TECHNICAL FIELD

The present disclosure relates to a technical filed of energy storage devices, and particularly relates to a battery.

BACKGROUND

With the improvement of electric vehicle technology, an electric vehicle are getting closer and closer to people's lives, and at the same time, the electric vehicle have higher and higher requirements for the performance of a battery that provides energy. During the use of the battery, it is necessary to prevent the battery from a short circuit.

During using the battery, it is necessary to prevent the battery from the short circuit. There are two types of the battery short circuit: internal short circuit and external short circuit. In the internal short circuit, a risk of short circuit caused by a contact between a negative tab and a positive electrode plate or a contact between a positive tab and a negative electrode plate is the highest.

After the above-mentioned internal short circuit occurs, the battery is prone to smoke, fire or even explode, causing a safety problem.

SUMMARY

A battery is provided by the present disclosure to solve the problems in a prior art and improve the safety of the battery.

The battery provided by the present disclosure includes: an electrode assembly, a first tab, a second tab, a cap plate assembly, a first electrode terminal, a second electrode terminal and a shaping plate;

the electrode assembly includes a first electrode plate, a second electrode plate and a separator arranged between the first electrode plate and the second electrode plate;

each of the first electrode terminal and the second electrode terminal is arranged on the cap plate assembly;

the first electrode terminal is connected to the first electrode plate through the first tab;

the second electrode terminal is connected to the second electrode plate through the second tab;

the shaping plate is arranged between the cap plate assembly and the electrode assembly, and each of the first tab and the second tab is bent around the shaping plate;

the shaping plate is fixed and thermally fused to the cap plate assembly.

According to any of the embodiments of the present disclosure, the cap plate assembly includes a cap plate and an insulation plate connected to the cap plate;

the insulation plate is arranged between the cap plate and the shaping plate;

the shaping plate is fixed and thermally fused to the insulation plate.

According to any of the embodiments of the present disclosure, the shaping plate includes a plate body and a pair of extension portions;

the pair of extension portions respectively extend from two short sides of the plate body in a direction away from the plate body;

a width dimension of the extension portion is smaller than a width dimension of the short side of the plate body;

the pair of extensions are respectively fixed and thermally fused to two ends of the insulation plate in a length direction.

According to any of the embodiments of the present disclosure, a pair of first concave portions are arranged on the insulation plate, the pair of first concave portions are respectively formed at the two ends of the insulation plate in the length direction, and the extension portions are accommodated in the first concave portions.

According to any of the embodiments of the present disclosure, the extension portion is in a shape of a rectangular plate; the first concave portion is a rectangular concave.

According to any of the embodiments of the present disclosure, the extension portion is thermally fused with a bottom surface of the first concave portion.

According to any of the embodiments of the present disclosure, the cap plate assembly includes a protrusion, the protrusion is arranged on a bottom surface of the first concave portion and protrudes from the bottom surface of the first concave portion;

the extension portion is provided with a through hole, the protrusion passes through the through hole and an end of the protrusion away from the cap plate assembly extends out the through hole, so that the extension portion is fixed to the protrusion.

According to any of the embodiments of the present disclosure, an explosion-proof valve is arranged on the cap plate assembly;

an air-passing hole corresponding to a position of the explosion-proof valve is formed in the shaping plate;

a pair of second concave portions are further formed on the insulation plate, the pair of second concave portions are respectively positioned at two ends of the insulation plate in a width direction, and parts of the shaping plate located on two sides of the air-passing hole are accommodated in the second concave portions.

According to any of the embodiments of the present disclosure, the parts of the shaping plate located on the two sides of the air-passing hole are thermally fused with a bottom surface of the second concave portion.

According to any of the embodiments of the present disclosure, the number of the electrode assembly is at least two;

the first tabs of the at least two electrode assemblies are connected to each other, and the second tabs of the at least two electrode assemblies are connected to each other;

the first tabs on the at least two electrode assemblies are respectively located on two sides of the shaping plate in a width direction; the second tabs on the at least two electrode assemblies are respectively located on two sides of the shaping plate in the width direction.

Another aspect of the present application provides an apparatus including the battery according to any of the above embodiments, wherein the battery is configured to provide power for the apparatus.

The technical solution provided by the present disclosure has at least the following beneficial effects:

the battery provided by the present disclosure includes the electrode assembly, the first tab, the second tab, the cap plate assembly, the first electrode terminal, the second electrode terminal and the shaping plate; the electrode assembly includes the first electrode plate, the second electrode plate and the separator arranged between the first electrode plate and the second electrode plate; each of the first electrode terminal and the second electrode terminal is arranged on the cap plate assembly; the shaping plate is arranged between the cap plate assembly and the electrode assembly, and each of the first tab and the second tab is bent around the shaping plate; the shaping plate is fixed and thermally fused to the cap plate assembly. The shaping plate is supported in the bent first tab and the bent second tab, which can prevent the first tab and the second tab from being inserted into an inside of the electrode assembly, so as to avoid the short circuit between the first tab and the second electrode plate and the short circuit between the second tab and the first electrode plate; therefore, the safety performance of the battery can be improved.

It should be understood that the above general description and the following detailed description are only exemplary and cannot limit the present disclosure.

BRIEF DESCRIPTION OF THE DRAWINGS

In order to more clearly illustrate the technical solutions of the embodiments of the present disclosure or the technical solutions in the prior art, the drawings to be used in the description of the embodiments of the present disclosure will be described briefly below. Obviously, the drawings in the following description are merely some embodiments of the present disclosure. For those skilled in the art, other drawings can also be obtained according to these drawings without the inventive labor.

Figure 1:
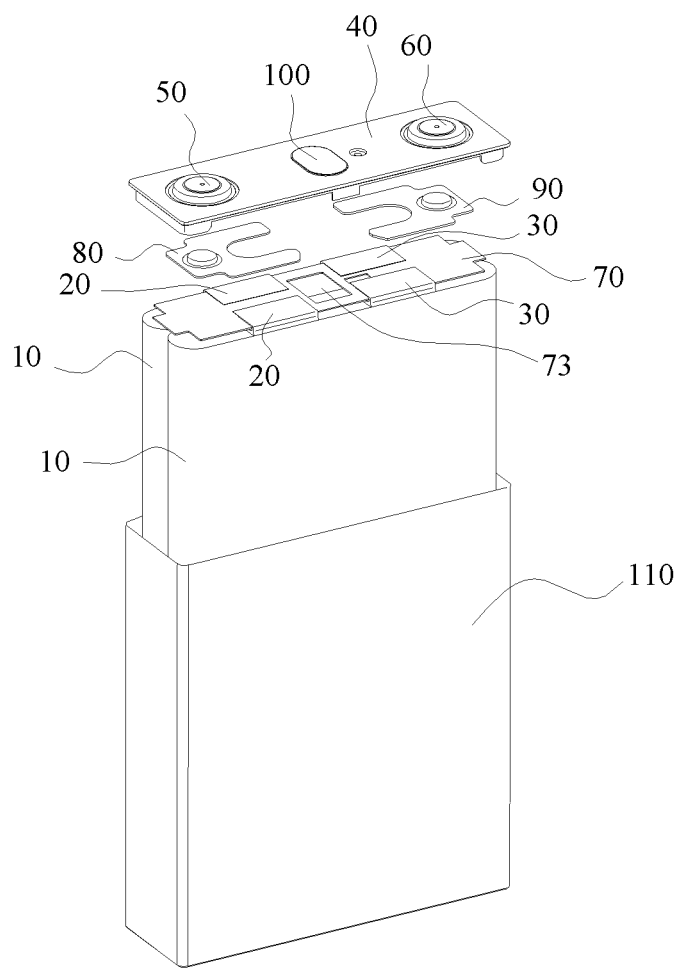
FIG. 1 shows an exploded schematic view of a battery according to an embodiment of the present disclosure.

In the drawings:
10—electrode assembly;
11—first electrode plate;
12—second electrode plate;
13—separator;
20—first tab;
30—second tab;
40—cap plate assembly;
41—cap plate;
  411—air-exhausting vent;
42—insulation plate;
  421—protrusion;
  422—first concave portion;
  423—second concave portion;
50—first electrode terminal;
60—second electrode terminal;
70—shaping plate;
71—plate body;
72—extension portion;
73—air-passing hole;
74—through hole;
75—long side;
76—short side;
80—first adapter plate;
90—second adapter plate;
100—explosion-proof valve;
110—case.

The drawings here are incorporated into the description and constitute a part of the description, show the embodiments that conform to the present disclosure, and are used to explain the principle of the present disclosure together with the description.

DETAILED DESCRIPTION

The technical solutions of the embodiments of the present disclosure will be clearly and completely described below in conjunction with the drawings of the embodiments of the present disclosure. It is apparent that the described embodiments are a part of the embodiments of the present disclosure, and not all of them. Based on the described embodiments of the present disclosure, all other embodiments obtained by those skilled in the art fall within the scope of the disclosure.

FIG. 1 shows an exploded schematic view of a battery according to an embodiment of the present disclosure; as shown in FIG. 1, the battery provided by the present disclosure includes: an electrode assembly 10, a first tab 20, a second tab 30, a cap plate assembly 40, a first electrode terminal 50, a second electrode terminal 60 and a shaping plate 70.

Figure 2:
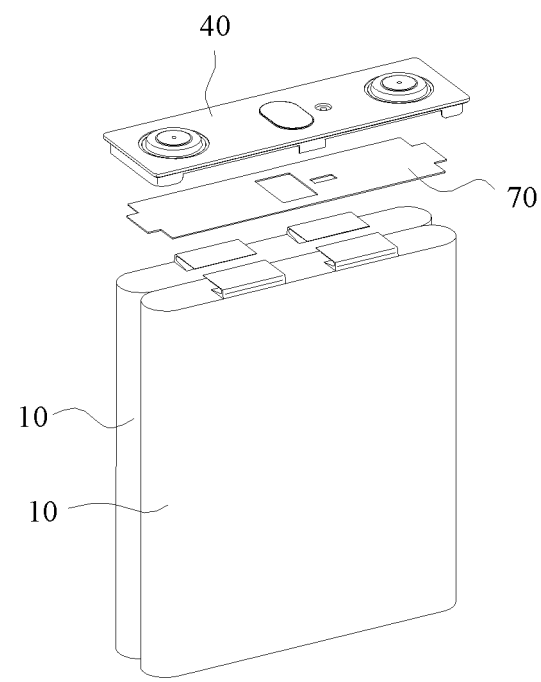
FIG. 2 shows another exploded schematic view of a battery according to an embodiment of the present disclosure.

FIG. 2 shows another exploded schematic view of the battery according to an embodiment of the present disclosure; in the embodiment shown in FIG. 1 and FIG. 2, the battery includes two electrode assemblies 10, and the two electrode assemblies 10 are assembled into a case 110 after assembled with a cap plate assembly 40 and other components. Certainly, the battery may also include more electrode assemblies 10, and FIG. 1 and FIG. 2 only take two electrode assemblies 10 as an example for description.

Figure 3:
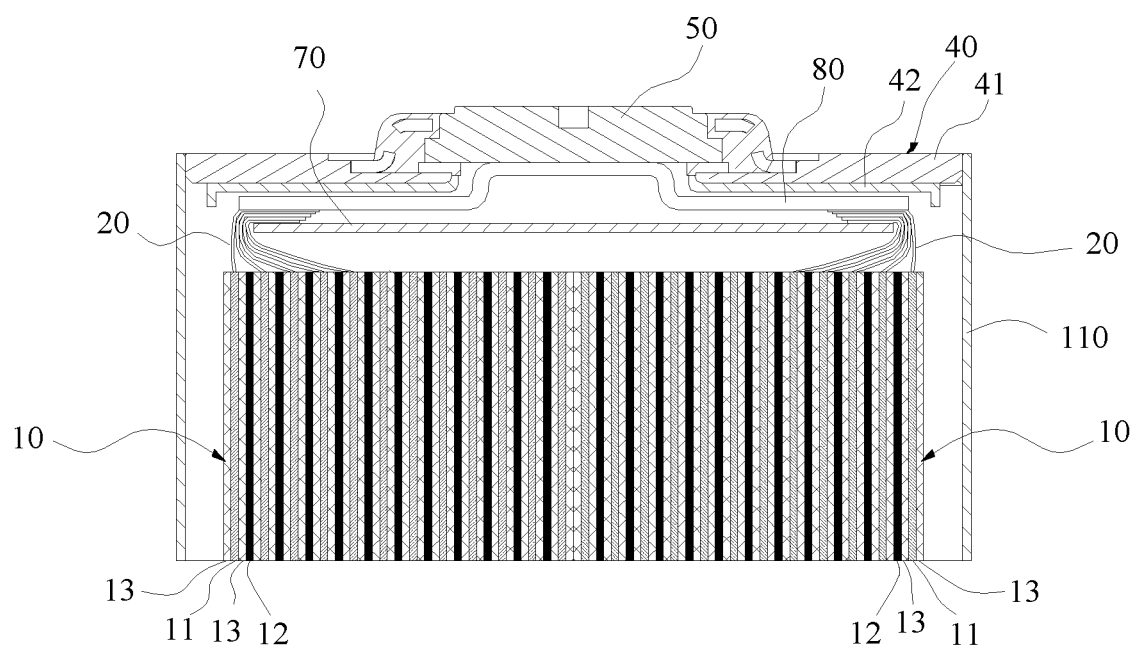
FIG. 3 shows a side cross-sectional view of a battery according to an embodiment of the present disclosure.

FIG. 3 shows a side cross-sectional view of the battery according to an embodiment of the present disclosure. As shown in FIG. 3, the electrode assembly 10 includes a first electrode plate 11, a second electrode plate 12 and a separator 13; the first electrode plate 11 and the second electrode plate 12 are insulated by the separator 13. The first electrode plate 11, the second electrode plate 12 and the separator 13 may form the electrode assembly by winding or stacking, and a chemical reaction occurs between the electrode assembly and an electrolyte to generate electrical energy. In this embodiment, illustratively, the first electrode plate 11 is used as a positive electrode plate, and the second electrode plate 12 is a negative electrode plate for description. In other embodiments, the first electrode plate 11 may also be the negative electrode plate, and the second electrode plate 12 may also be the positive electrode plate. In addition, a coated area of the positive electrode plate may be coated with a positive active material, and a coated area of the negative electrode plate may be coated with a negative active material. An uncoated portion extending from the coated area of the positive electrode plate is served as a positive tab, and the first tab 20 in this embodiment may be the positive tab; an uncoated portion extending from the coated area of the negative electrode plate is served as a negative tab, and the second tab 30 in this embodiment may be the negative tab. The first electrode plate 11 is electrically connected to the first electrode terminal 50 through the first tab 20, and the second electrode plate 12 is electrically connected to the second electrode terminal 60 through the second tab 30, thereby outputting the generated electrical energy to an outside; each of the first electrode terminal 50 and the second electrode terminal 60 is arranged on the cap plate assembly 40.

As shown in FIG. 3, the first tab 20 may be formed of a plurality of uncoated portions extending from the coated area of the positive electrode plate, and the second tab 30 may be formed of a plurality of uncoated portions extending from the coated area of the negative electrode plate. The first electrode plate 11 of the electrode assembly 10 is connected to the first electrode terminal 50 (at this time the first electrode terminal 50 is a positive terminal) through the first tab 20. The second electrode plate 12 of the electrode assembly 10 is connected to the second electrode terminal 60 (the second electrode terminal 60 at this time is a negative terminal) through the second tab 30.

The shaping plate 70 is arranged between the cap plate assembly 40 and the electrode assembly 10; each of the first tab 20 and the second tab 30 is bent around the shaping plate 70, so that the shaping plate 70 is supported in the bent first tab 20 and the bent second tab 30. Before a process of assembling the electrode assembly 10 into the case 110, the first tab 20 and the second tab 30 need to be bent; after bending, since the first tab 20 and the second tab 30 are relatively soft and have a multi-layer structure, they are prone to collapse and deform, and prone to a short circuit with the first electrode plate 11 or the second electrode plate 12. The shaping plate 70 is supported in the bent first tab 20 and the bent second tab 30, which can prevent the first tab 20 and the second tab 30 from being inserted into an inside of the electrode assembly 10 due to without restriction; the first tab 20 and the second tab 30 maintain a certain bent shape, which can avoid the short circuit between the first tab 20 and the second electrode 12 and the short circuit between the second tab 30 and the first electrode plate 11; therefore, the safety performance of the battery can be improved.

Figure 4:
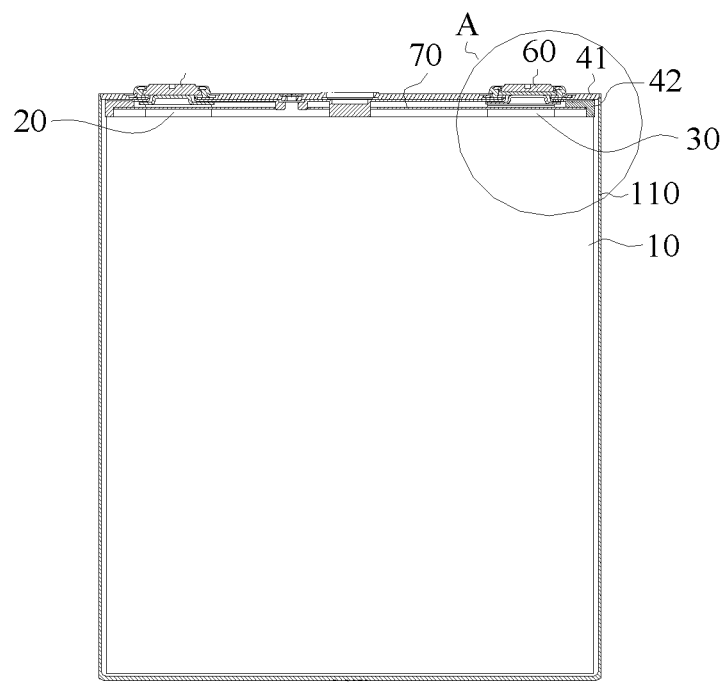
FIG. 4 shows a main cross-sectional view of the battery according to an embodiment of the present disclosure, which is cut through at an upper portion.
Figure 5:
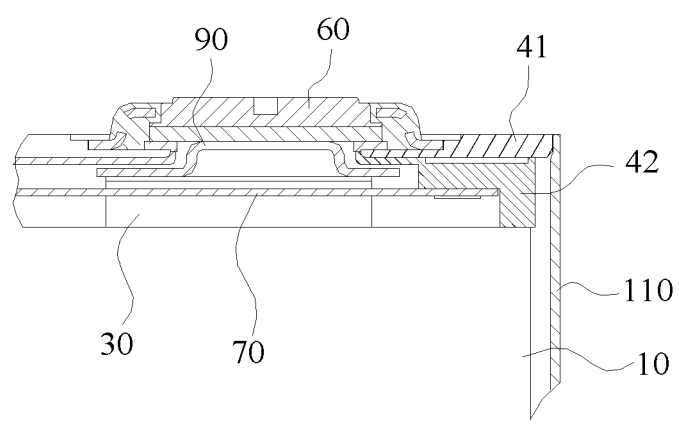
FIG. 5 shows an enlarged view of a portion A in FIG. 4.

In this embodiment, the shaping plate 70 is fixed and thermally fused to the cap plate assembly 40. FIG. 4 shows a main cross-sectional view of the battery according to an embodiment of the present disclosure, in which the upper portion of the battery is cut through, and FIG. 5 shows an enlarged view of a position A in FIG. 4. As shown in FIG. 4 and FIG. 5, the cap plate assembly 40 may include a cap plate 41 and an insulation plate 42 connected to the cap plate 41; herein the insulation plate 42 is arranged between the cap plate 41 and the shaping plate 70 to isolate the cap plate 41 from a conductive component inside the case 110; the shaping plate 70 is fixed and thermally fused to the insulation plate 42.

The cap plate assembly 40 is fixed to the shaping plate 70 by means of thermal fusion, which can simplify an installation process of the shaping plate 70; and the shaping plate 70 and the cap plate assembly 40 are directly connected by means of a thermal fusion, which can be conducive to support the first tab 20 and the second tab 30, further prevent the first tab 20 and the second tab 30 from being inserted into the inside of the electrode assembly, and avoid the phenomenon of the short circuit between the first tab and the second electrode plate 12 and the short circuit between the second tab and the first electrode plate 11.

A material of the insulation plate 42 may be a plastic, that is, the insulation plate 42 can be a plastic plate. As shown in FIG. 5, the shaping plate 70 is supported in the bent second tab 30, and the insulation plate 42 is fixed and thermally fused to the shaping plate 70. A fixing hole can be arranged on a side of the cap plate 41 facing to the insulation plate 42; a hook can be arranged at a side of the insulation plate 42 facing to the cap plate 41; the hook extends into the fixing hole, and then the hook is thermally fused, so as to achieve the fixed connection between the insulation plate 42 and the cap plate 41.

Figure 6:
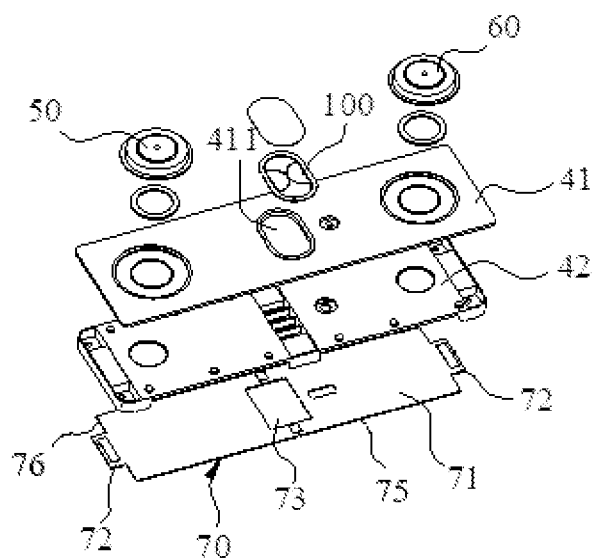
FIG. 6 shows an exploded schematic view of a cap plate assembly and a shaping plate being thermally fused.
Figure 7:
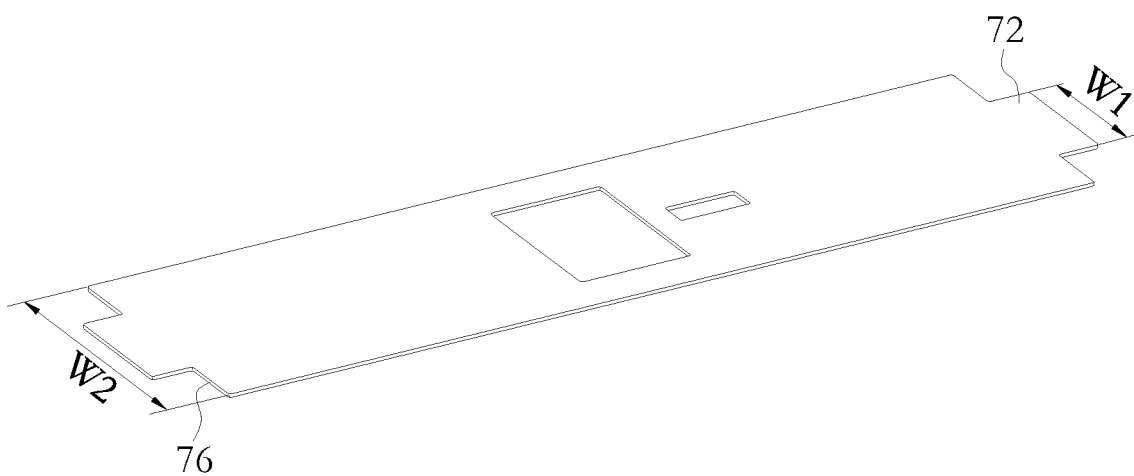
FIG. 7 shows a structure schematic view of a shaping plate.

As shown in FIG. 6 and FIG. 7, the shaping plate may include a plate body 71 and a pair of extension portion 72; a cross section of the plate body 71 may be rectangular; the pair of extension portion 72 respectively extend out from two short sides 76 of the plate body 71 in a direction away from the plate body 71; a width dimension W1 of the extension portion is smaller than a width dimension W2 of the short side 76 of the plate body 71, and the pair of extension portions 72 are respectively thermally fused and fixed to two ends of the insulation plate 42 in a length direction.

Figure 8:
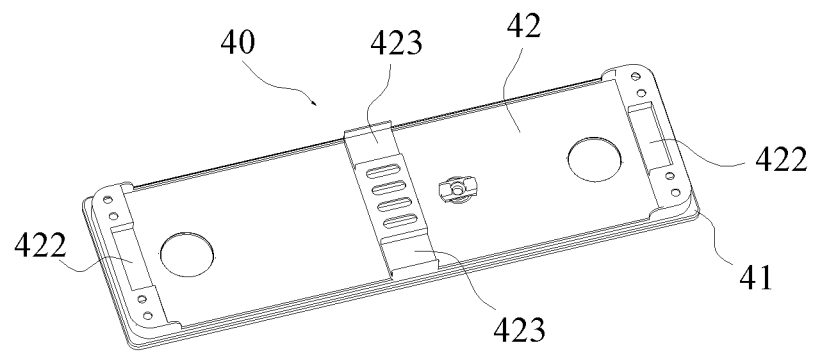
FIG. 8 shows a structure schematic view of a cap plate assembly.
Figure 9:
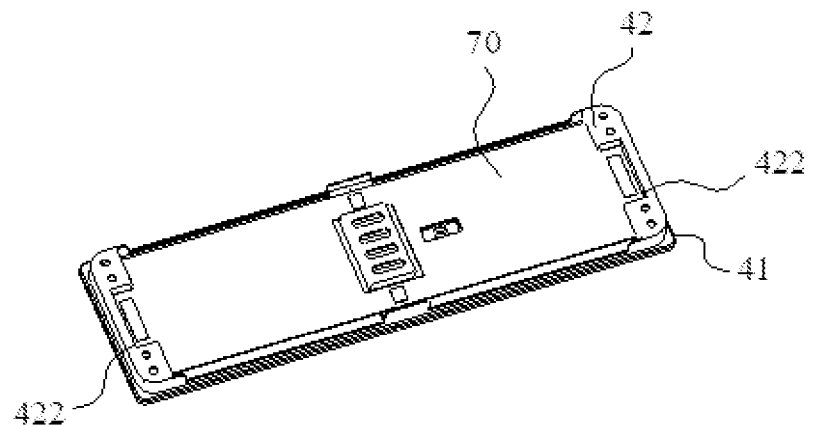
FIG. 9 shows a state view of a cap plate assembly and a shaping plate being fixed and thermally fused together.
Figure 10:
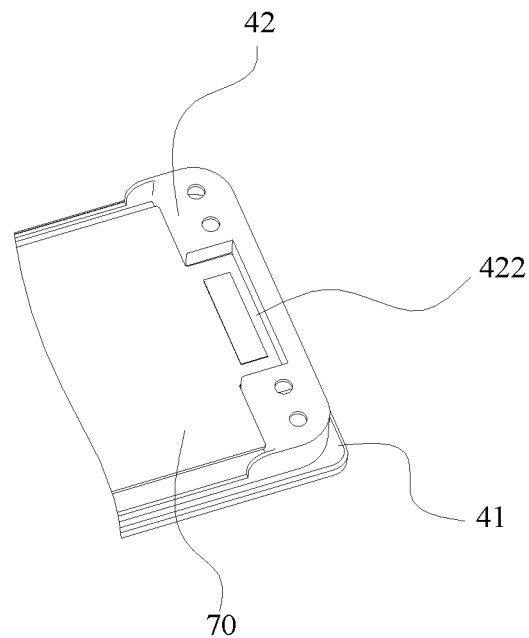
FIG. 10 shows a partial enlarged view of FIG. 9.

Optionally, as shown in FIGS. 8-10, a pair of first concave portions 422 are arranged on the insulation plate 42, the pair of first concave portions 422 are respectively formed at two ends of the insulation plate 42 in the length direction, and the extension portions 72 are accommodated in the first concave portions 422. The first concave portion 422 is arranged on the insulation plate 42 to position the extension portion 72, which can make a position of the shaping plate 70 on the cap plate assembly 40 more accurate during the process of assembling a cell; after the tab is bent, the shaping plate 70 can be supported at the most suitable position to avoid an internal short circuit caused by a collapse of the tab. Moreover, since the extension portion 72 is accommodated in the first concave portion 422, an internal space occupied by the shaping plate 70 can be reduced, and an energy density of the battery can be improved.

The extension portion 72 as described above may be in a shape of a rectangular plate, which has a simple shape and is convenient for processing. Correspondingly, the first concave portion 422 is a rectangular concave that matches with the shape of the extension portion 72 to provide precise positioning for the extension portion 72. Optionally, the extension portion 72 is fixed and thermally fused to a bottom surface of the first concave portion 422; the first concave portion 422 can position the extension portion 72 and also be fixed and thermally fused to the extension portion 72, which can improve the reliability of connection between the shaping plate 70 and the cap plate assembly 40.

Figure 11:
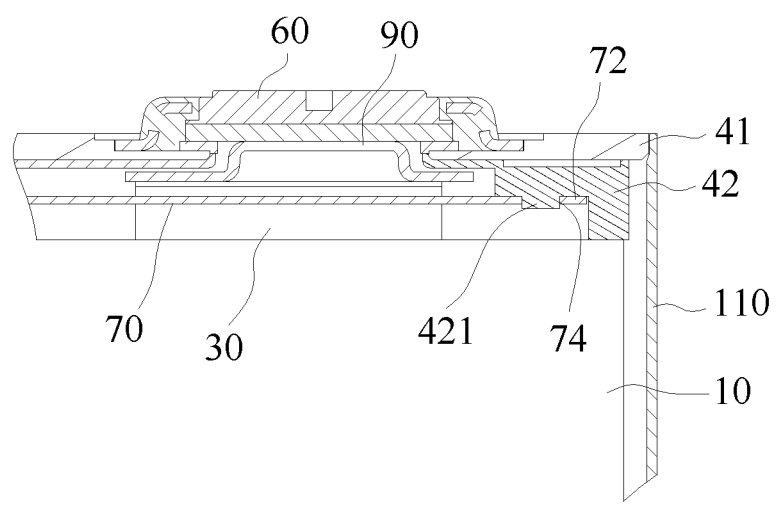
FIG. 11 shows a schematic view of a cooperation manner between an insulation plate and a shaping plate.

As an implementation, as shown in FIG. 11, the cap plate assembly 40 includes a protrusion 421, the protrusion 421 is arranged on the bottom surface of the first concave portion 422 and protrudes from the bottom surface of the first concave portion 422. The extension portion 72 is provided with a through hole 74, the protrusion 421 passes through the through hole 74 and an end of the protrusion 421 away from the cap plate assembly 40 extends out a hole wall of the through hole 74, so that the extension portion 72 is fixed to the protrusion 421. When the shaping plate 10 is assembled with and the cap plate assembly 40, the protrusion 421 can play a role in positioning and ensure a position accuracy of the shaping plate 10. After the thermal fusion, the extension portion 72 of the shaping plate 70 is connected at a position where is cooperated with the protrusion 421.

As shown in FIG. 1 and FIG. 6, since a large number of chemical materials are contained in the battery, such as the electrolyte, a large amount of mixed gas, liquid or other materials will be produced during charging and discharging, resulting in continuous accumulation of pressure; in this case, optionally, in order to prevent the battery from exploding due to the excessive pressure, the battery provided by the embodiment of the present disclosure further includes an explosion-proof valve 100. The explosion-proof valve 100 is arranged on the cap plate assembly 40; specifically, the explosion-proof valve 100 is arranged on the cap plate 41 of the cap plate assembly 40. Correspondingly, an air-exhausting vent 411, corresponding to a position of the explosion-proof valve 100, is arranged on the cap plate 41; and an air-passing hole 73, corresponding to the position of the explosion-proof valve 100, is also formed in the shaping plate 70. Because the air-passing hole 73 corresponds to the position of the explosion-proof valve 100, the gas generated in the battery can easily reach to the explosion-proof valve 100, which can reduce a probability of danger.

As shown in FIG. 8, a pair of second concave portions 423 are further formed on the insulation plate 42, the pair of second concave portions 423 are respectively positioned at two ends of the insulation plate 42 in a width direction, and parts of the shaping plate 70 located on two sides of the air-passing hole 73 are accommodated in the second concave portions 423. An arrangement of the second concave portion 423 can limit the position of the shaping plate 70 in a width direction of the shaping plate 70, which can improve a positioning accuracy of the shaping plate 70.

Optionally, the parts of the shaping plate 70 located on the two sides of the air-passing hole 73 are thermally fused with a bottom surface of the second concave portion 423. The second concave portion 423 positions the parts of the shaping plate 70 near the long side 75 located on the two sides of the air-passing hole 73, and at the same time is fixed and thermally fused to the shaping plate 70, which can improve the reliability of connection between the shaping plate 70 and the cap plate assembly 40.

Further, as shown in FIG. 1, the battery provided by the embodiment of the present disclosure further includes a first adapter plate 80 and a second adapter plate 90; the first electrode terminal 50 is connected to the first tab 20 through the first adapter plate 80, and the second electrode terminal 60 is connected to the second tab 30 through the second adapter plate 90. For example, the number of each of the electrode assembly 10, first tab 20 and second tab 30 is at least two, and each electrode assembly 10 is connected to the first tab 20 and the second tab 30. In the case that the number of each of the first tab 20 and the second tab 30 are at least two, they can be bent and wound on two sides of the shaping plate 70; for example, the bent first tab 20 is connected to the first electrode terminal 50 through the first adapter plate 80. The bent second tab 30 is connected to the second electrode terminal 60 through the second adapter plate 90, which can achieve an effect of improving an order of a component inside the battery.

Figure 12:
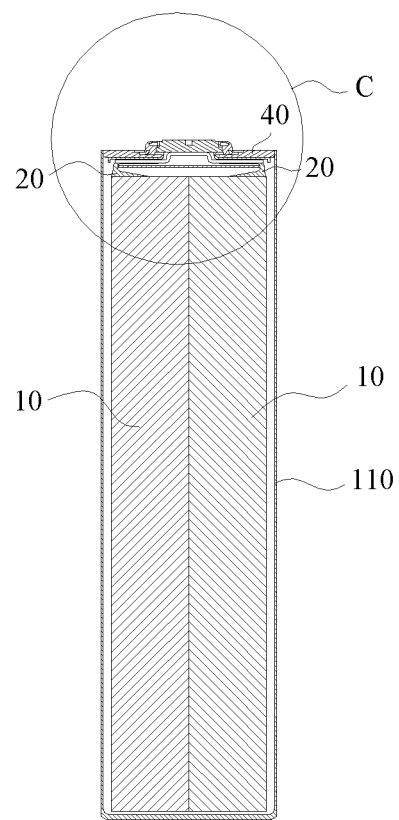
FIG. 12 shows a side cross-sectional view of a battery according to an embodiment of the present disclosure.
Figure 13:
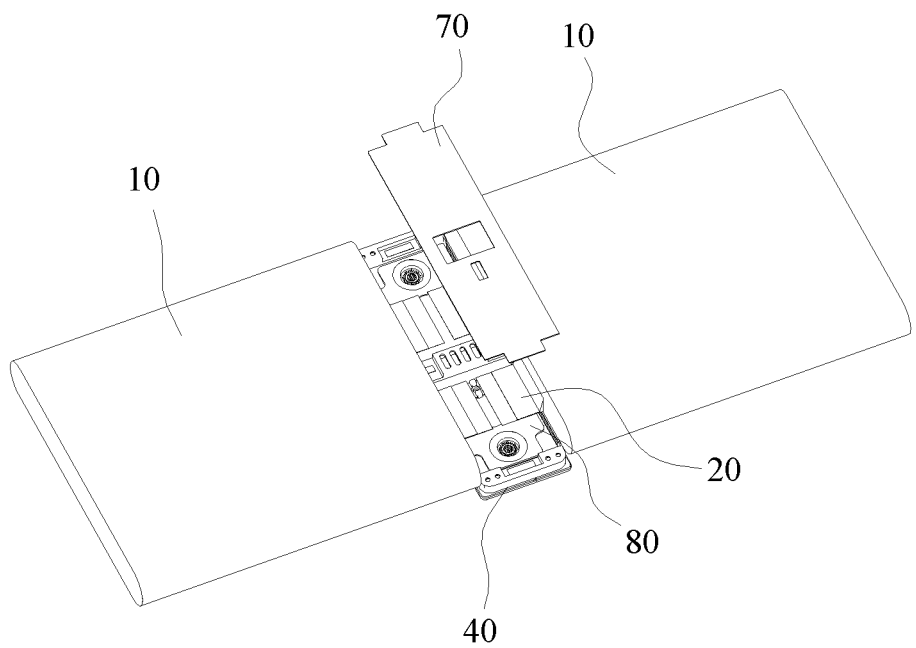
FIG. 13 shows an enlarged view of a position C in FIG. 12.

As described above, the number of the electrode assembly 10 may be at least two. FIG. 12 shows a side cross-sectional view of the battery according to an embodiment of the present disclosure; FIG. 13 shows an enlarged view of a position C in FIG. 12. As shown in FIG. 12 and FIG. 13, each of the two electrode assemblies 10 is connected to the first tab 20 and the second tab 30; each of the bent first tab 20 and the bent second tab 30 on the two electrode assemblies 10 is supported by the same shaping plate 70. The first tabs 20 on the two electrode assemblies 10 are respectively located on two sides of the shaping plate 70 in the width direction, and the second tabs 30 on the two electrode assemblies 10 are respectively located on two sides of the shaping plate 70 in the width direction. Thus, the two electrode assemblies 10 share one shaping plate 70 without using too many components, thereby reducing an overall size of the battery and not occupying too much space.

Figure 14:
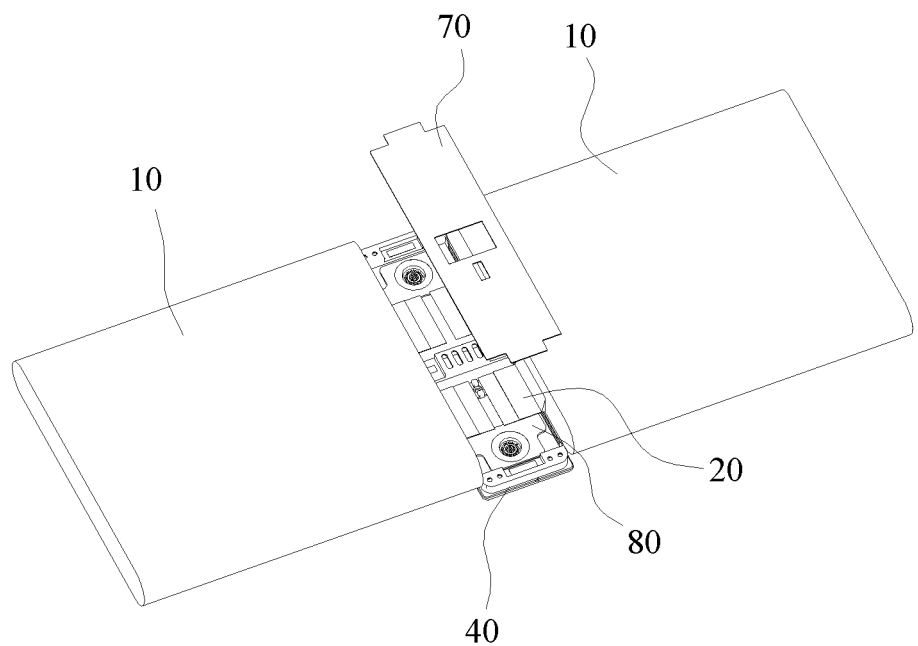
FIG. 14 shows a schematic view of an assembling process of a battery according to an embodiment of the present disclosure.

FIG. 14 shows a schematic view of an assembly process of the battery according to an embodiment of the present disclosure. As shown in FIG. 14, when assembling the electrode assemblies 10, firstly, the two electrode assemblies 10 are laid flat and arranged facing to each other, at this time, the tabs of the two electrode assemblies 10 are facing to each other.

FIG. 11 illustrates a position of the first tab 20 as an example. It can be understood that an assembling method implemented at the side where the second tab 30 is located is the same as an assembling method implemented at the side where the first tab 20 is located. After the two electrode assemblies 10 are laid flat and arranged facing to each other, the first adapter plate 80 is welded to the first tab 20 (in FIG. 14, the first adapter plate 80 is located below the first tab 20, and the same method is used on a side where the second adapter plate 90 is located), then the cap plate assembly 40 is moved, the first electrode terminal 50 on the cap plate assembly 40 are welded and fixed to the first adapter plate 80, then the shaping plate 70 is thermally fused and fixed to the insulation plate 42 of the cap plate assembly 40, at last the two electrode assemblies 10 are turned over to bend the first tab 20 and the second tab 30.

Thus, the first tabs 20 and the second tabs 30 on the two electrode assemblies 10 are wound around the shaping plate 70, and the shaping plate 70 is supported in the bent first tabs 20 and the bent second tabs 30, which can prevent the first tab 20 and the second tab 30 from being inserted into the inside of the electrode assembly 10, so as to avoid the phenomenon of the short circuit between the second tab 30 and the first electrode plate 11 and the short circuit between the first tab 20 and the second electrode plate 12; therefore, the safety performance of the battery can be improved.

The embodiments of the present disclosure further provide an apparatus, which includes the battery according to any of the embodiments as described above, and the battery is configured to provide power for the apparatus. The apparatus may be an electric vehicle, a hybrid vehicle, an electric scooter, an electric cart or any other suitable devices which can include the battery as their own power source.

The above descriptions are only the embodiments of the present disclosure, and are not used to limit the present disclosure. For those skilled in the art, the present disclosure may have various modifications and changes. Any modification, equivalent replacement, improvement, etc. made within the spirit and principle of the present disclosure should be included in the protection scope of the present disclosure.

What is claimed is:

1. A battery, comprising: an electrode assembly, a first tab, a second tab, a cap plate assembly, a first electrode terminal, a second electrode terminal and a shaping plate, wherein
the electrode assembly comprises a first electrode plate, a second electrode plate and a separator arranged between the first electrode plate and the second electrode plate;
each of the first electrode terminal and the second electrode terminal is arranged on the cap plate assembly;
the first electrode terminal is connected to the first electrode plate through the first tab;
the second electrode terminal is connected to the second electrode plate through the second tab;
the shaping plate is arranged between the cap plate assembly and the electrode assembly, and each of the first tab and the second tab is bent around the shaping plate;
wherein the cap plate assembly comprises a cap plate and an insulation plate connected to the cap plate;
the insulation plate is arranged between the cap plate and the shaping plate;
the shaping plate is fixed and thermally fused to the insulation plate.

2. The battery according to claim 1, wherein the shaping plate comprises a plate body and a pair of extension portions;
the pair of extension portions respectively extend from two short sides of the plate body in a direction away from the plate body;
a width dimension of the extension portion is smaller than a width dimension of the short side of the plate body;
the pair of extension portions are respectively fixed and thermally fused to two ends of the insulation plate in a length direction.

3. The battery according to claim 2, wherein a pair of first concave portions are arranged on the insulation plate, the pair of first concave portions are respectively formed at the two ends of the insulation plate in the length direction, and the extension portions are accommodated in the first concave portions.

4. The battery according to claim 3, wherein the extension portion is in a shape of a rectangular plate; the first concave portion is a rectangular concave.

5. The battery according to claim 3, wherein the extension portion is thermally fused with a bottom surface of the first concave portion.

6. The battery according to claim 3, wherein the cap plate assembly comprises a protrusion, the protrusion is arranged on a bottom surface of the first concave portion and protrudes from the bottom surface of the first concave portion;
the extension portion is provided with a through hole, the protrusion passes through the through hole and an end of the protrusion away from the cap plate assembly extends out a hole wall of the through hole, so that the extension portion is fixed to the protrusion.

7. The battery according to claim 3, wherein an explosion-proof valve is arranged on the cap plate assembly;
an air-passing hole corresponding to a position of the explosion-proof valve is formed in the shaping plate;
a pair of second concave portions are further formed on the insulation plate, the pair of second concave portions are respectively positioned at two ends of the insulation plate in a width direction, and parts of the shaping plate located on two sides of the air-passing hole are accommodated in the second concave portions.

8. The battery according to claim 7, wherein the parts of the shaping plate located on the two sides of the air-passing hole are thermally fused with a bottom surface of the second concave portion.

9. The battery according to claim 1, wherein the number of the electrode assembly is at least two;
the first tabs of the at least two electrode assemblies are connected to each other, and the second tabs of the at least two electrode assemblies are connected to each other;
the first tabs of the at least two electrode assemblies are respectively located on two sides of the shaping plate in a width direction; the second tabs on the at least two electrode assemblies are respectively located on two sides of the shaping plate in the width direction.

10. An apparatus, comprising the battery according to claim 1, wherein the battery is configured to provide power for the apparatus.

* * * * *